UNITED STATES PATENT OFFICE.

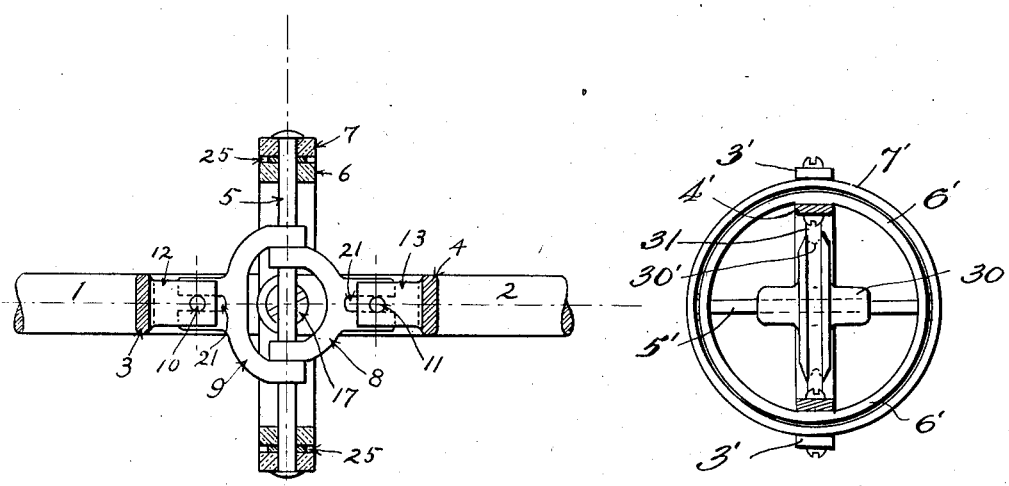
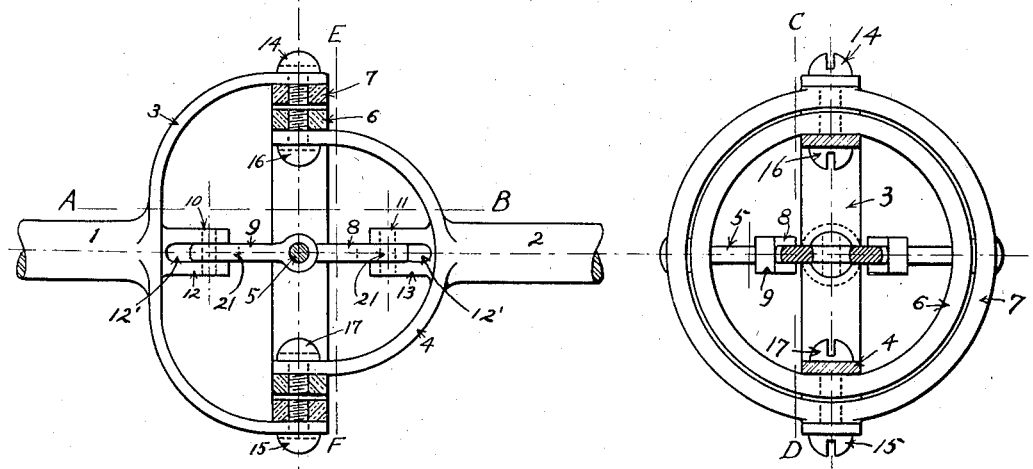
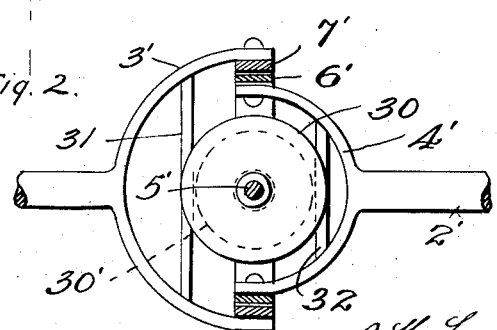

RICHARD H. LOWNDES, OF ATLANTA, GEORGIA.

UNIVERSAL JOINT.

1,058,878.  Specification of Letters Patent.  Patented Apr. 15, 1913.

Application filed June 18, 1912. Serial No. 704,448.

*To all whom it may concern:*

Be it known that I, RICHARD H. LOWNDES, citizen of the United States, residing at Atlanta, in the county of Fulton and State of Georgia, have invented certain new and useful Improvements in Universal Joints, of which the following is a specification.

My invention relates to universal joints for transmitting rotation from a driving shaft to a driven shaft.

The primary object of my invention is to provide a universal joint by which rotation may be transmitted from the driving shaft to the driven shaft with a constant velocity ratio through various relative angles of the two shafts.

A further object of my invention is to provide a universal joint which shall possess extreme flexibility, thus adapting it particularly for use with motor vehicles wherein the angle between the two shafts is more or less constantly changing.

A further object of my invention is to provide a universal joint which shall be of extremely simple construction and inexpensive to manufacture.

The invention consists in the novel construction, arrangement and combinations of parts as hereinafter fully described, illustrated in the drawings, and pointed out in the appended claims.

In the drawings: Figure 1 is a horizontal sectional view of my invention on line A—B of Fig. 2, the driving and driven shafts to which the joint is applied being shown broken away. Fig. 2 is a sectional view on line C—D of Fig. 3 i. e. at right angles to the line of section of Fig. 1. Fig. 3 is a sectional view on line E—F of Fig. 2. Figs. 4 and 5 are sectional elevations of the invention at right angles to each other showing different means for maintaining the pin connecting the two rings in the center of the angle formed by the two shafts.

1 indicates the driving shaft, the rotation of which is to be transmitted at a constant velocity ratio to the driven shaft 2. The adjacent ends of the two shafts are constructed to form yokes or forks 3 and 4, respectively, the two yokes being adapted to lie in the same longitudinal plane as the two shafts when the latter are in axial alinement. Said adjacent ends of the shafts are also provided with axial tongues or extensions 12 and 13 respectively which extend toward each other and each being provided with a slot 12'.

7 indicates a ring arranged between the outer ends of the arms of the yoke 3 and pivoted thereto by means of pivots or trunnions 14 and 15, and 6 indicates a ring arranged over the outer ends of the arms of yoke 4 and pivoted thereto by means of pivots or trunnions 16 and 17. The ring 6 is smaller than the ring 7 within which latter it is arranged, and said rings 6 and 7 are pivotally connected together by means of a pin 5 which extends diametrically through the rings 6 and 7 at right angles to the trunnions 14, 15, 16 and 17.

The whole principle of the transmission of constant velocity ratio depends upon keeping the rings in proper relation, and with a view of insuring a constant velocity ratio between the driving shaft and the driven shaft the plane through the pin 5 perpendicular to the plane of the shafts must always bisect the angle between the shafts. The provision of means for accomplishing this result is of vital importance to the proper operation of the invention and the accomplishment of the primary object of the invention. This result may be accomplished by various means and it will be understood that I do not limit myself to any particular means by which said result may be accomplished.

In the drawings I have illustrated, as examples only, several means for accomplishing the desired object.

Referring to Figs. 1, 2 and 3, 8 and 9 indicate arms which at their inner adjacent ends have a pivotal as well as a slidable connection with the pin 5, and their outer ends being slidingly arranged within the slots 12' of the shaft extensions or tongues 12. Pins 10 and 11 extend across the slots 12' and slots 21 formed in the arms 8 and 9, whereby the latter are adapted to have a pivotal and slidable bearing upon the said pins 11 and 10. The inner ends of arms 8 and 9 may slide along pin 5 when the shafts are more or less at an angle to each other, while at the same time the outer ends of said arms may turn upon pins 11 and 10, and also have a sliding movement thereupon. Thus the two arms need not remain in the same plane but may rotate with respect to each other about the line of pin 5 to permit flexibility of the joint. It will be observed that the tongue or extension 12 of shaft 1 has a flexible connection with the ring 6 through the media of the arm 9 and pin 5, while the tongue or extension 13 of shaft 2 has a similar connection with ring 6 through the media of arm 8 and pin 5. 25 are washers mounted on the pin 5 near the outer ends thereof and intermediate the rings 6 and 7.

In Figs. 4 and 5 I show a spool-shaped member 30 loosely mounted upon pin 5' and adapted to slide thereupon. The pin 5' corresponds to the pin 5 in Figs. 1, 2 and 3. 6' and 7' indicate two rings corresponding to the rings 6 and 7 shown in Figs. 1, 2 and 3, and the rings 7' and 6' are pivoted to the yokes 3' and 4' respectively of the driving and driven shafts 1' and 2'. The rings 6' and 7' are pivotally connected together by means of pin 5'. Secured to the arms of the yokes 3' and 4' respectively are guides in the form of pins 31 and 32 arranged on opposite sides of the pin 5' and which pins 31 and 32 at points intermediate their ends are slidingly arranged within the circumferential groove 30' of the spool-shaped member 30 on opposite sides thereof. As the angle of the two shafts varies the pins 31 and 32 act to shift the member 30 on the pin 5' and also to swing the rings on their pivots, and during this operation the member 30 will have a sliding as well as a pivotal or rocking movement upon the guides 31, 32.

While I have hereinbefore described the shaft 1 as being the driving shaft and the shaft 2 as being the driven shaft, it will be understood that 2 may constitute the driving shaft and 1 the driven shaft.

What I claim is:

1. The combination with a driving shaft and a driven shaft provided at their adjacent ends with yokes, of a ring trunnioned to the yoke on one of the shafts, a ring trunnioned to the yoke on the other shaft and arranged within the first-mentioned ring, a pin forming trunnions for the rings and extending diametrically of said rings, and means intermediate the said pin and the adjacent ends of the shafts having pivotal and slidable connection with the said shafts and the said pin to maintain the said pin in the center of the angle formed by the shafts.

2. The combination with a driving shaft and a driven shaft provided at their adjacent ends with yokes, of a ring trunnioned to the yoke on one of the shafts, a ring trunnioned to the yoke on the other shaft and arranged within the first-mentioned ring, a pin forming trunnions for the rings and extending diametrically across the inner ring, guides carried by the yokes, on opposite sides of said pin, and means pivotally and slidably mounted upon said pin and having pivotal and slidable bearings upon said guides.

3. The combination with a driving shaft and a driven shaft provided at their adjacent ends with yokes, of a ring trunnioned to the yoke on one of the shafts, a ring trunnioned to the yoke on the other shaft and arranged within the first-mentioned ring, a pin forming trunnions for the rings and extending diametrically of said rings, guides arranged on opposite sides of said pin, and means slidably mounted upon said pin and having pivotal and slidable bearings upon said guides.

4. The combination with a driving shaft and a driven shaft provided at their adjacent ends with yokes, of a ring trunnioned to the yoke on one of the shafts, a ring trunnioned to the yoke on the other shaft and arranged within the first-mentioned ring, a pin forming trunnions for the rings and extending diametrically of said rings, guides carried by the yokes on opposite sides of said pin, and means slidably mounted upon said pin and having pivotal and slidable bearings upon said guides.

5. The combination with a driving shaft and a driven shaft provided at their adjacent ends with yokes, of a ring trunnioned to the yoke on one of the shafts, a ring trunnioned to the yoke on the other shaft and arranged within the first-mentioned ring, a pin forming trunnions for the rings and extending diametrically of said rings, guides carried by the yokes on opposite sides of said pin, and a spool-shaped member slidingly mounted on the said pin and having a circumferential groove in which said guides are arranged.

In testimony whereof I affix my signature in presence of two witnesses.

RICHARD H. LOWNDES.

Witnesses:
R. Q. ZULLER,
GEORGE R. HOOD.